United States Patent
Novlan et al.

(10) Patent No.: US 10,129,782 B2
(45) Date of Patent: Nov. 13, 2018

(54) METHODS AND APPARATUS FOR CSI MEASUREMENT CONFIGURATION AND REPORTING ON UNLICENSED SPECTRUM

(71) Applicant: Samsung Electronics Co., Ltd, Suwon-si (KR)

(72) Inventors: Thomas Novlan, Dallas, TX (US); Boon Loong Ng, Plano, TX (US); Jianzhong Zhang, Plano, TX (US); Eko Onggosanusi, Allen, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 15/005,938

(22) Filed: Jan. 25, 2016

(65) Prior Publication Data

US 2016/0227428 A1    Aug. 4, 2016

Related U.S. Application Data

(60) Provisional application No. 62/251,411, filed on Nov. 5, 2015, provisional application No. 62/195,870, filed
(Continued)

(51) Int. Cl.
*H04W 24/10*  (2009.01)
*H04W 48/16*  (2009.01)
(Continued)

(52) U.S. Cl.
CPC .......... *H04W 24/10* (2013.01); *H04L 5/0053* (2013.01); *H04W 48/16* (2013.01); *H04W 16/14* (2013.01); *H04W 76/28* (2018.02)

(58) Field of Classification Search
CPC ... H04W 24/10; H04W 76/045; H04W 16/14; H94W 48/16; H04L 5/00
See application file for complete search history.

(56) References Cited

U.S. PATENT DOCUMENTS 8,543,128 B2    9/2013 Jen
9,603,084 B2 *  3/2017 Kim ...................... H04W 48/16
(Continued)

FOREIGN PATENT DOCUMENTS

WO     2012124552 A1    9/2012
WO  WO 2014/186943 A1  11/2014

OTHER PUBLICATIONS

International Search Report dated May 24, 2016 in connection with International Application No. PCT/KR2016/001010, 3 pages.
(Continued)

*Primary Examiner* — Mohammad S Anwar

(57) ABSTRACT

A method for channel state information (CSI) measurement. The method comprises receiving a reference signal that is periodically transmitted in one or more discovery reference signal (DRS) occasions from an eNodeB (eNB) operating in a cell over an unlicensed spectrum band, wherein the reference signal in the one or more DRS occasions is dropped in accordance with at least one of a listen before talk (LBT) operation and a discontinuous transmission (DTX) operation and the reference signal includes at least one of a cell-specific reference signal (CRS) and a channel state information-reference signal (CSI-RS). The method further comprises measuring the received reference signal to generate a CSI measurement report and transmitting the CSI measurement report to the eNB according to a configuration received from the eNB.

20 Claims, 9 Drawing Sheets

Related U.S. Application Data on Jul. 23, 2015, provisional application No. 62/110,064, filed on Jan. 30, 2015.

(51) Int. Cl.
*H04L 5/00* (2006.01)
*H04W 16/14* (2009.01)
*H04W 76/28* (2018.01)

(56) References Cited

U.S. PATENT DOCUMENTS

| | | | | |
|---|---|---|---|---|
| 9,867,056 | B2* | 1/2018 | Han | ............... H04L 5/00 |
| 2011/0312358 | A1 | 12/2011 | Barbieri et al. | |
| 2012/0155312 | A1* | 6/2012 | Kim | ............. H04W 24/10 370/252 |
| 2013/0100919 | A1* | 4/2013 | Han | ............. H04W 99/00 370/329 |
| 2013/0252626 | A1* | 9/2013 | Lee | ............. H04W 72/1231 455/452.1 |
| 2014/0204807 | A1 | 7/2014 | Li et al. | |
| 2015/0163008 | A1* | 6/2015 | Kim | ............. H04J 11/0069 370/252 |
| 2015/0373674 | A1* | 12/2015 | Han | ............. H04W 16/14 370/329 |
| 2016/0135179 | A1* | 5/2016 | Yin | ............. H04J 11/0069 370/329 |

OTHER PUBLICATIONS

Written Opinion of the International Searching Authority dated May 24, 2016 in connection with International Application No. PCT/KR2016/001010, 5 pages.
Catt, "Listen Before Talk for LAA", 3GPP TSG RAN WG1 Meeting #79, R1-144625, San Francisco, California, Nov. 17-21, 2014, 6 pages.
3rd Generation Partnership Project; Technical Specification Group Radio Access Network; Small cell enhancements for E-UTRA and E-UTRAN—Physical layer aspects; 3GPP TR 36.872 V12.0.0 (Sep. 2013)—78 Pages.
3rd Generation Partnership Project; Technical Specification Group Radio Access Network; Evolved Universal Terrestrial Radio Access (E-UTRA); Requirements for support of radio resource management; 3GPP TS 36.133 V12.7.0 (Mar. 2015)—1014 Pages.
3rd Generation Partnership Project; Technical Specification Group Radio Access Network; Evolved Universal Terrestrial Radio Access (E-UTRA); Physical channels and modulation; 3GPP TS 36.211 V12.2.0 (Jun. 2014)—121 Pages.
3rd Generation Partnership Project; Technical Specification Group Radio Access Network; Evolved Universal Terrestrial Radio Access (E-UTRA); Multiplexing and channel coding; 3GPP TS 36.212 V12.2.0 (Sep. 2014)—89 pages.
3rd Generation Partnership Project; Technical Specification Group Radio Access Network; Evolved Universal Terrestrial Radio Access (E-UTRA); Physical layer procedures; 3GPP TS 36.213 V12.2.0 (Jun. 2014)—207 Pages.
3rd Generation Partnership Project; Technical Specification Group Radio Access Network; Evolved Universal Terrestrial Radio Access (E-UTRA); Radio Resource Control (RRC); Protocol specification; 3GPP TS 36.331 V12.2.0 (Jun. 2014)—365 Pages.
LTE; Evolved Universal Terrestrial Radio Access (E-UTRA); Multiplexing and channel coding (3GPP TS 36.212 version 12.2.0 Release 12) ; ETSI TS 136 212 V12.2.0 (Oct. 2014)—91 Pages.
Broadband Radio Access Networks (BRAN); 5 GHz high performance RLAN;Harmonized EN covering the essential requirementsof article 3.2 of the R&TTE Directive; ETSI EN 301 893 V1.7.1 (Jun. 2012)—90 Pages.
Extended European Search Report for European Application No. 16743732.6, dated Jun. 27, 2017 (11 pages).
Alcatel-Lucent, et al., "Remaining Issues for CSI-RS for CoMP", 3GPP TSG RAN WG1 Meeting #69, R1-122485, Prague, Czech Republic, May 21-25, 2012 (3 pages).
NEC, "Remaining CSI measurement/feedback issue of discovery reference signal", 3GPP TSG RAN WG1 Meeting #78, R1-143148, Dresden, Germany, Aug. 18-22, 2014 (3 pages).
Huawei, et al., "Further analysis on the required functionalities for LAA", 3GPP TSG RAN WG1 Meeting #79, R1-144590, San Francisco, USA, Nov. 17-21, 2014 (4 pages).
Catt, "Discontinuous transmission on Scell for LAA", 3GPP TSG RAN WG1 Meeting #79, R1-144626, San Francisco, USA, Nov. 17-21, 2014 (3 pages).
Communication pursuant to Article 94(3) EPC, dated Feb. 15, 2018. (8 pages).
European Patent Office Communication regarding Application No. 16743732.6, dated Sep. 10, 2018, 6 pages.

\* cited by examiner

METHODS AND APPARATUS FOR CSI MEASUREMENT CONFIGURATION AND REPORTING ON UNLICENSED SPECTRUM

CROSS-REFERENCE TO RELATED APPLICATION(S) AND CLAIM OF PRIORITY

This application claims priority under 35 U.S.C. § 119(e) to U.S. Provisional Patent Application No. 62/110,064 filed on Jan. 30, 2015, entitled METHODS AND APPARATUS FOR CSI MEASUREMENT CONFIGURATION AND REPORTING ON UNLICENSED SPECTRUM and U.S. Provisional Patent Application No. 62/195,870 filed on Jul. 23, 2015 entitled METHODS AND APPARATUS FOR CSI MEASUREMENT CONFIGURATION AND REPORTING ON UNLICENSED SPECTRUM and U.S. Provisional Patent Application No. 62/251,411 filed on Nov. 5, 2015 entitled METHODS AND APPARATUS FOR CSI MEASUREMENT CONFIGURATION AND REPORTING ON UNLICENSED SPECTRUM. The above-identified provisional patent applications are hereby incorporated by reference in its entirety.

TECHNICAL FIELD

This disclosure relates generally to wireless communication systems. More specifically, this disclosure relates to method and apparatus for CSI measurement configuration and reporting on unlicensed spectrum.

BACKGROUND

A long term evolution (LTE) radio access technology (RAT) may be deployed on an unlicensed frequency spectrum, which is also known as licensed assisted access (LAA) or LTE unlicensed (LTE-U). One of possible deployment scenarios for the LAA is to deploy LAA carriers as a part of carrier aggregations, where an LAA carrier is aggregated with another carrier on a licensed frequency spectrum. In a conventional scheme, a carrier on a licensed frequency spectrum is assigned as a primary cell (PCell) and a carrier on an unlicensed frequency spectrum is assigned as a secondary cell (SCell) for a UE. Since there may be other RATs operating on the same unlicensed frequency spectrum as the LAA carrier, there is a need to enable co-existence of other RAT with LAA on an unlicensed frequency spectrum without undesirable interference between heterogeneous RATs.

SUMMARY

This disclosure provides method and apparatus for CSI measurement configuration and reporting on unlicensed spectrum.

In one embodiment, a user equipment (UE) is provided. The UE includes a transceiver configure to receive a reference signal that is periodically received one or more discovery reference signal (DRS) occasions from an eNodeB (eNB) operating in a cell over an unlicensed spectrum band. The reference signal in the one or more DRS occasions is dropped in accordance with at least one of a listen before talk (LBT) operation and a discontinuous transmission (DTX) operation. The reference signal includes at least one of a cell-specific reference signal (CRS) and a channel state information-reference signal (CSI-RS). The UE includes the transceiver further configured to transmit a CSI measurement report to the eNB according to a configuration received from the eNB. The UE includes at least one processor configured to measure the received reference signal to generate the CSI measurement report.

In another embodiment, a method for channel state information (CSI) measurement in a wireless communication system is provided. The method includes receiving a reference signal that is periodically transmitted in one or more discovery reference signal (DRS) occasions from an eNodeB (eNB) operating in a cell over an unlicensed spectrum band. The reference signal in the one or more DRS occasions is dropped in accordance with at least one of a listen before talk (LBT) operation and a discontinuous transmission (DTX) operation. The reference signal includes at least one of a cell-specific reference signal (CRS) and a channel state information-reference signal (CSI-RS). The method further includes measuring the received reference signal to generate a CSI measurement report and transmitting the CSI measurement report to the eNB according to a configuration transmitted from the eNB.

In another embodiment, an eNodeB (eNB) is provided. The eNB comprises a transceiver configure to periodically transmit a reference signal in one or more discovery reference signal (DRS) occasions to a user equipment (UE) operating in a cell over an unlicensed spectrum band. The reference signal in the one or more DRS occasions is dropped in accordance with at least one of a listen before talk (LBT) operation and a discontinuous transmission (DTX) operation. The reference signal includes at least one of a cell-specific reference signal (CRS) and a channel state information-reference signal (CSI-RS). The eNB comprises the transceiver further configured to receive a CSI measurement report from the UE according to a configuration transmitted to the UE. The eNB comprises at least one processor configured to process the CSI measurement report received from the UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 12, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

The following documents and standards descriptions are hereby incorporated by reference into the present disclosure as if fully set forth herein: 3GPP TS 36.211 v12.2.0, "E-UTRA, Physical channels and modulation" (REF1); 3GPP TS 36.212 v12.2.0, "E-UTRA, Multiplexing and Channel coding" (REF2); 3GPP TS 36.213 v12.2.0, "E-UTRA, Physical Layer Procedures" (REF3); 3GPP TR 36.872 v12.0.0, "Small cell enhancements for E-UTRA and E-UTRAN —Physical layer aspects" (REF4); 3GPP TS 36.133 v12.7.0, "E-UTRA, Requirements for support of radio resource management" (REF5); 3GPP TS 36.331 v12.2.0, "E-UTRA, Radio Resource Control (RRC) Protocol Specification"; and ETSI EN 301 893 v1.7.1 (2012-06), Harmonized European Standard, "Broadband Radio Access Networks (BRAN); 5 GHz high performance RLAN."

Figure 1:
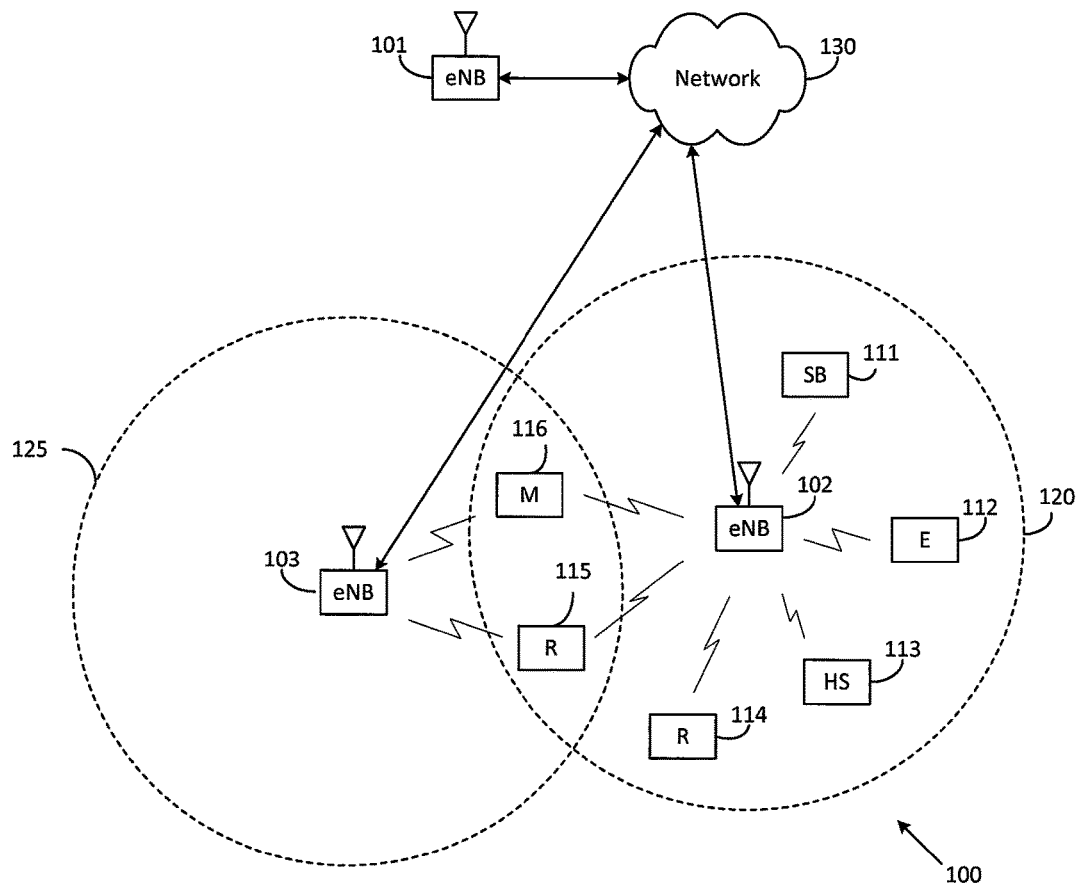
FIG. 1 illustrates an example wireless network according to embodiments of the present disclosure.
Figure 2:
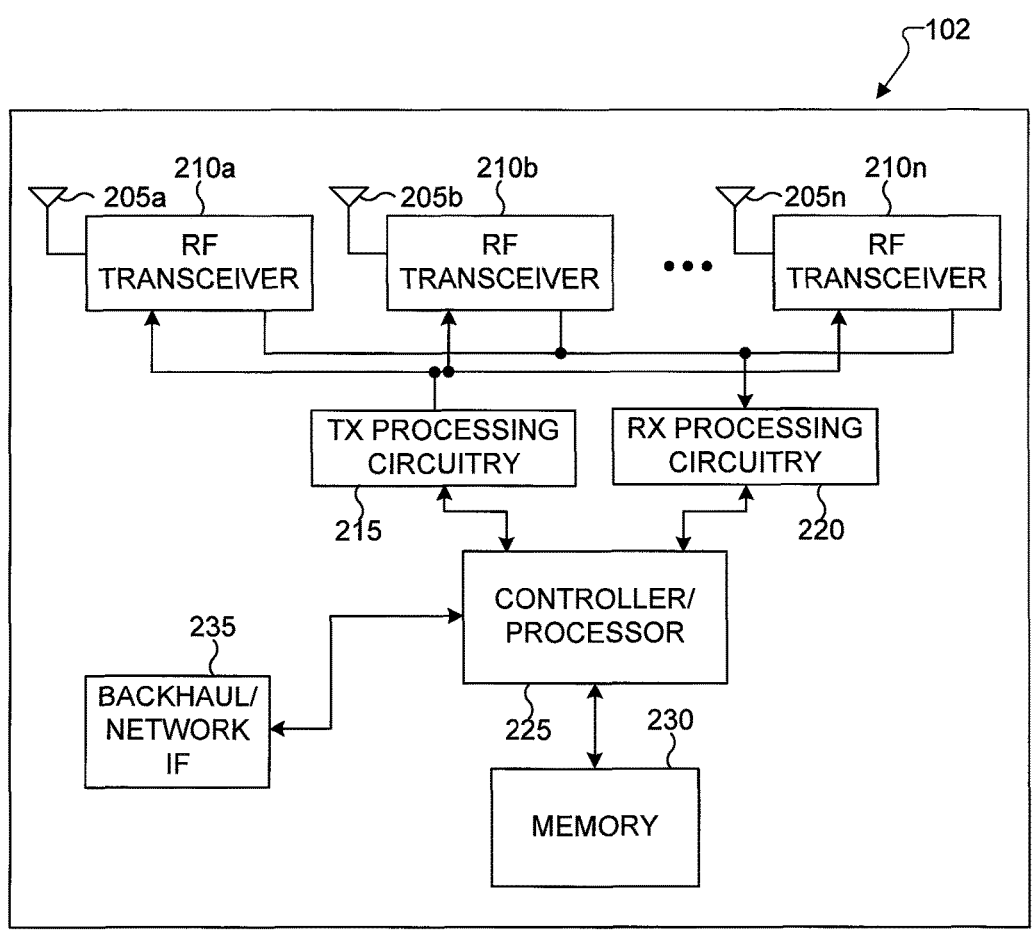
FIG. 2 illustrates an example eNodeB (eNB) according to embodiments of the present disclosure.
Figure 3:
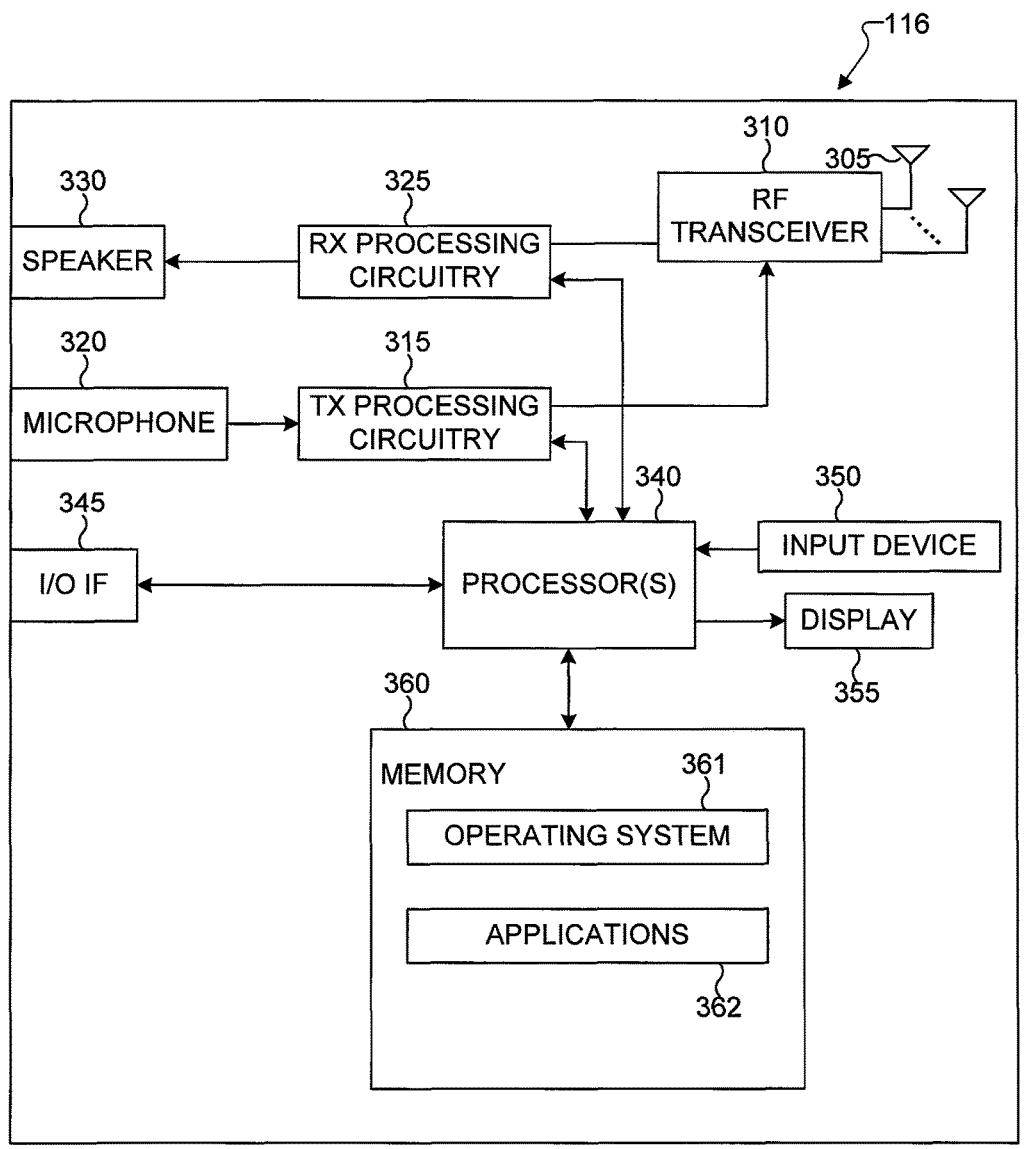
FIG. 3 illustrates an example user equipment (UE) according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, LTE-U(LAA) or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for processing of channel state information (CSI) configuration and generating of CSI measurement reporting on unlicensed frequency spectrum and/or licensed frequency spectrum. In certain embodiments, and one or more of the eNBs 101-103 includes circuitry, programing, or a combination thereof, for generating of CSI configuration and processing of CSI measurement reporting on unlicensed spectrum and/or licensed spectrum. In some embodiment, the eNBs 101-103 periodically and/or aperiodically transmits a reference signal in one or more discovery reference signal (DRS) occasions to a user equipment (UE) operating in a licensed-assisted access (LAA) cell over an unlicensed spectrum band, wherein the reference signal includes at least one of a cell-specific reference signal (CRS) and a channel state information-reference signal (CSI-RS). The eNBs 101-103 receives a CSI measurement report from the UE according to a configuration transmitted to the UE.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n. In some embodiment, the RF transceivers 210a-210n are configure to periodically and/or aperiodically transmit a reference signal in one or more DRS occasions to a UE operating in an LAA cell over an unlicensed spectrum band, wherein the reference signal includes at least one of a CRS and a CSI-RS. In addition, the RF transceivers 210a-210n are further configured to receive a CSI measurement report from the UE according to a configuration transmitted to the UE.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller. In some embodiments, the controller/processor 225 is configured to generate a CSI to be transmitted to a UE and process a CSI measurement report received from the UE.

As described in more detail below, the eNB 102 includes circuitry, programing, or a combination thereof for generating of CSI configuration and processing of CSI measurement report on unlicensed spectrum and/or licensed spectrum. In some embodiment, the eNBs 102 periodically and/or aperiodically transmits a reference signal in one or more DRS occasions to a UE operating in an LAA cell over an unlicensed spectrum band, wherein the reference signal includes at least one of a CRS and a CSI-RS. The eNBs 102 receives a CSI measurement report from the UE according to a configuration transmitted to the UE.

For example, controller/processor 225 can be configured to execute one or more instructions, stored in memory 230, that are configured to cause the controller/processor to generate a CSI configuration and process a CSI measurement report on unlicensed spectrum and/or licensed spectrum.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, LTE-A, or LTE-U(LAA))), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes a set of antennas 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the set of antennas 305, an incoming RF signal transmitted by an eNB of the network 100. The RF transceiver 310 down-converts the incoming RF signal to generate an intermediate frequency (IF) or baseband signal. In some embodiment, the RF transceiver receives a reference signal that is periodically and/or aperiodically transmitted in one or more DRS occasions transmitted from the eNBs 101-103 operating in an LAA cell over an unlicensed spectrum band, wherein the reference signal includes at least one of a CRS and a CSI-RS and transmit a CSI measurement report to the eNBs 101-103 according to a configuration transmitted from the eNBs 101-103.

The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes a reference signal to measure CSI in order to transmit a CSI measurement report to eNBs 101-103 operating an LAA cell over unlicensed spectrum and/or licensed spectrum.

The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350 and the display 355. The operator of the UE 116 can use the input device 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the UE 116 may include only one antenna 305 or any number of antennas 305. Also, while FIG. 3 illustrates the UE 116 configured as a mobile telephone or smartphone, UEs could be configured to operate as other types of mobile or stationary devices.

Figure 4A:
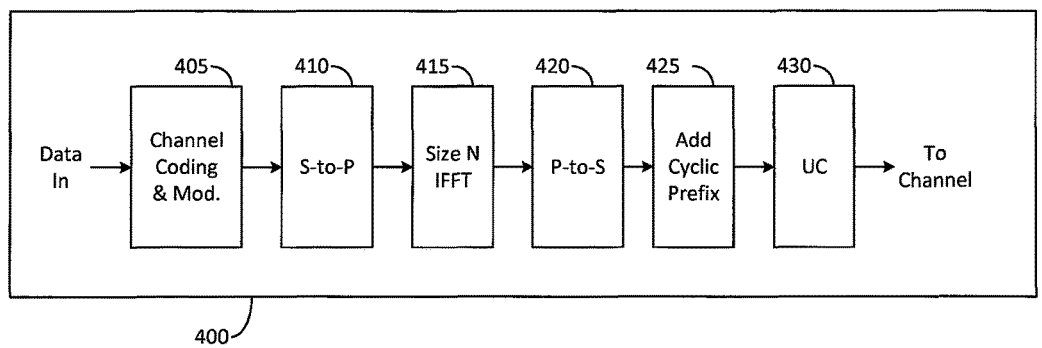
FIG. 4A illustrates a high-level diagram of an orthogonal frequency division multiple access transmit path according to embodiments of the present disclosure.
Figure 4B:
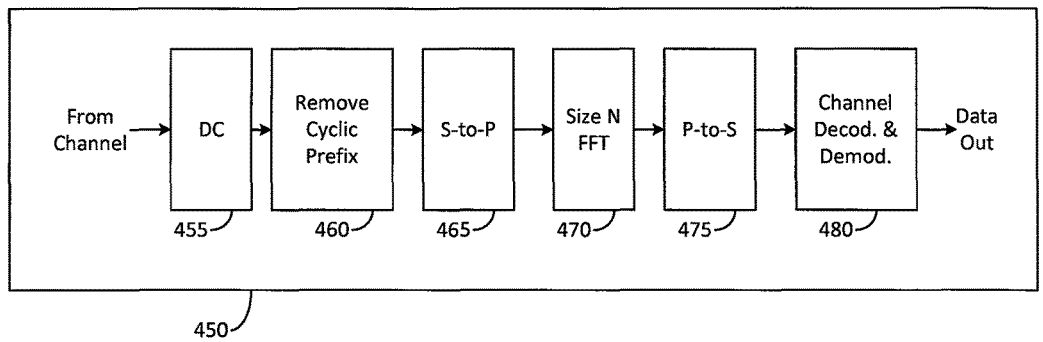
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an OFDMA communication. FIG. 4B is a high-level diagram of receive path circuitry 450. For example, the receive path circuitry 450 may be used for an OFDMA communication. In FIGS. 4A and 4B, for downlink communication, the transmit path circuitry 400 can be implemented in a base station (eNB) 102 or a relay station, and the receive path circuitry 450 may be implemented in a user equipment (such as user equipment 116 of FIG. 1). In other examples, for uplink communication, the receive path circuitry 450 can be implemented in a base station (such as 102 of FIG. 1) or a relay station, and the transmit path circuitry 400 can be implemented in a user equipment (such as user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B can be implemented in software, while other components can be implemented by configurable hardware or a mixture of software and configurable hardware. In particular, it is noted that the FFT blocks and the IFFT blocks described in this disclosure document can be implemented as configurable software algorithms, where the value of Size N can be modified according to the implementation.

In transmit path circuitry 400, channel coding and modulation block 405 receives a set of information bits, applies coding (such as low-density parity-check (LDPC) coding) and modulates (such as Quadrature Phase Shift Keying (QPSK) or Quadrature Amplitude Modulation (QAM)) the input bits to produce a sequence of frequency-domain modulation symbols. Serial-to-parallel block 410 converts (such as de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (such as multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (such as up-converts) the output of add cyclic prefix block 425 to RF frequency for transmission via a wireless channel. The signal can also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 can implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Figure 5:
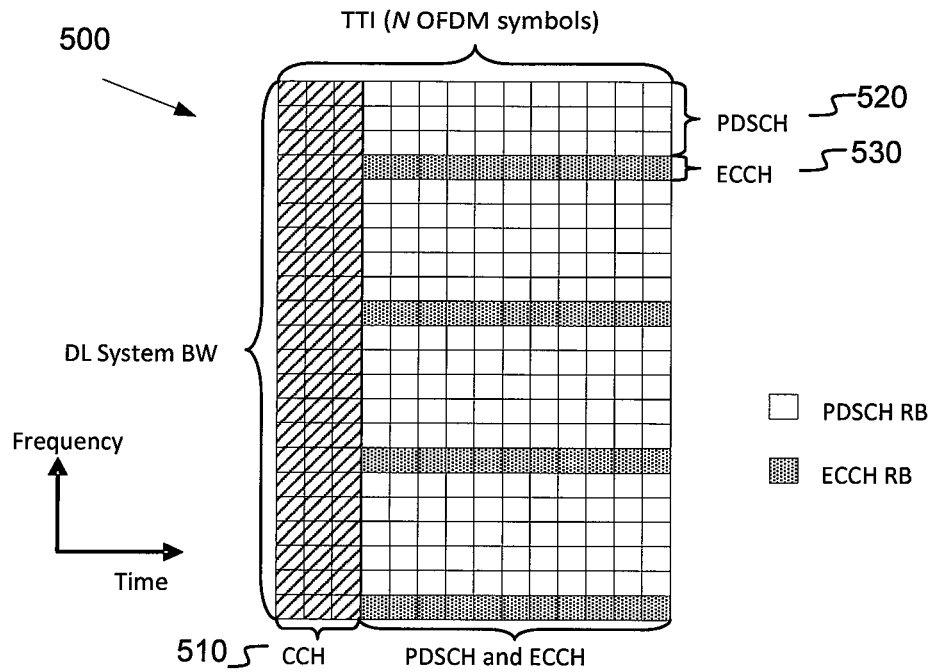
FIG. 5 illustrates an example structure for a downlink (DL) transmission time interval (TTI) according to embodiments of the present disclosure.

FIG. 5 illustrates an example structure for a DL TTI 500 according to embodiments of the present disclosure. An embodiment of the DL TTI structure 500 shown in FIG. 5 is for illustration only. Other embodiments can be used without departing from the scope of the present disclosure.

As illustrated in FIG. 5, a DL signaling uses OFDM and a DL TTI includes N=14 OFDM symbols in the time domain and K resource blocks (RBs) in the frequency domain. A first type of control channels (CCHs) is transmitted in a first $N_1$ OFDM symbols 510 including no transmission, $N_1=0$. Remaining $N-N_1$ OFDM symbols are primarily used for transmitting PDSCHs 520 and, in some RBs of a TTI, for transmitting a second type of CCHs (ECCHs) 530.

An eNB 103 also transmits primary synchronization signals (PSS) and secondary synchronization signals (SSS), so that UE 116 synchronizes with the eNB 103 and performs cell identification. There are 504 unique physical-layer cell identities. The physical-layer cell identities are grouped into 168 unique physical-layer cell-identity groups which of each group contains three unique identities. The grouping is such that each physical-layer cell identity is part of one and only one physical-layer cell-identity group. A physical-layer cell identity $N_{ID}^{cell}=3N_{ID}^{(1)}+N_{ID}^{(2)}$ is thus uniquely defined by a number $N_{ID}^{(1)}$ in the range of 0 to 167, representing the physical-layer cell-identity group, and a number $N_{ID}^{(2)}$ in the range of 0 to 2, representing the physical-layer identity within the physical-layer cell-identity group. Detecting a PSS enables a UE 116 to determine the physical-layer identity as well as a slot timing of the cell transmitting the PSS. Detecting a SSS enables the UE 116 to determine a radio frame timing, the physical-layer cell identity, a cyclic prefix length as well as the cell uses ether a frequency division duplex (FDD) or a time division duplex (TDD) scheme.

Figure 6:
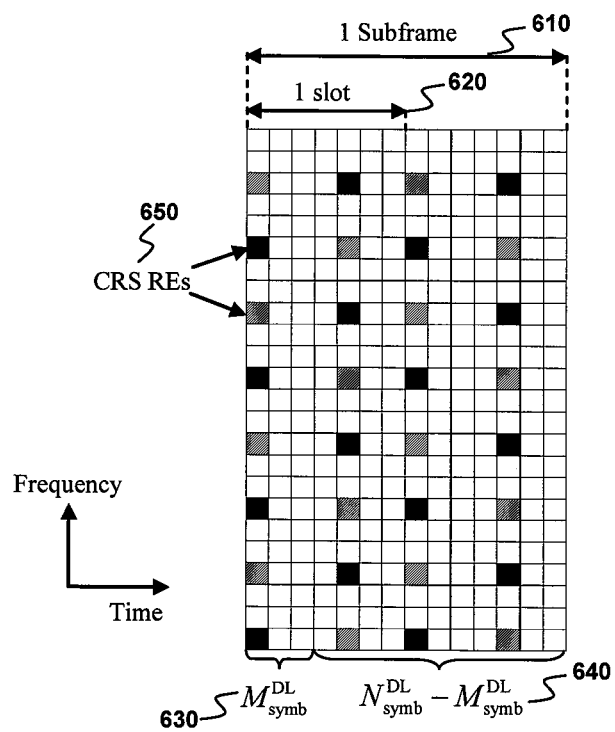
FIG. 6 illustrates an example structure for a common reference signal resource element (CRS RE) mapping according to embodiments of the present disclosure.

FIG. 6 illustrates an example structure for a CRS RE mapping 600 according to embodiments of the present disclosure. An embodiment of the CRS RE mapping 600 shown in FIG. 6 is for illustration only. Other embodiments may be used without departing from the scope of the present disclosure.

To assist cell search and synchronization, DL signals include synchronization signals such as a primary synchronization signal (PSS) and a secondary synchronization signal (SSS). Although having the same structure, the time-domain positions of the synchronization signals within a sub-frame 610 that includes at least one slot 620 differs depending on whether a cell is operating in frequency division duplex (FDD) or time division duplex (TDD). Therefore, after acquiring the synchronization signals, a UE determines whether a cell operates on the FDD or on the TDD, and a subframe index within a frame. The PSS and SSS occupy the central 72 sub-carriers, also referred to as resource elements (REs) 650, of an operating bandwidth. Additionally, the PSS and SSS inform of a physical cell identifier (PCID) for a cell and therefore, after acquiring the PSS and SSS, a UE knows the PCID of the transmitting cell.

Figure 7:
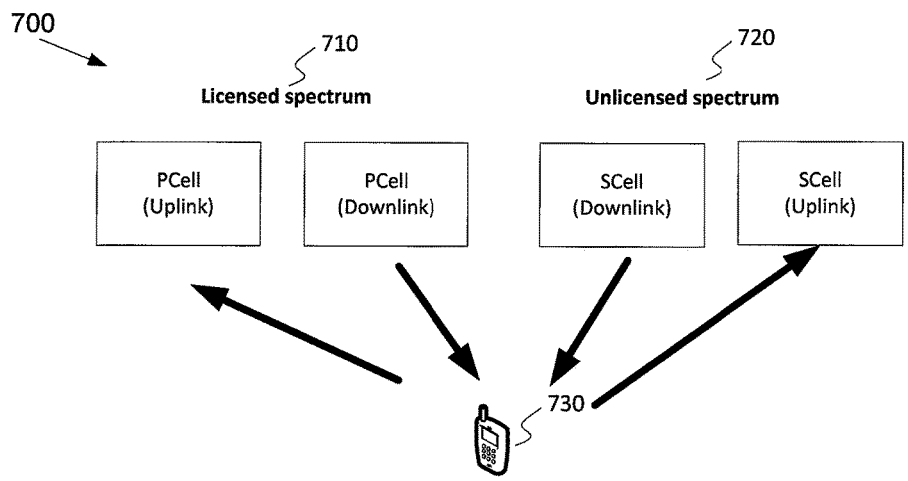
FIG. 7 illustrates an example carrier aggregation scheme on licensed and unlicensed spectrum according to embodiments of the present disclosure.

FIG. 7 illustrates an example carrier aggregation scheme on licensed and unlicensed spectrum 700 according to embodiments of the present disclosure. An embodiment of the carrier aggregation on licensed and unlicensed spectrum 700 shown in FIG. 7 is for illustration only. Other embodiments may be used without departing from the scope of the present disclosure.

A possible deployment scenario for LAA is to deploy an LAA carrier as a part of a carrier aggregation scheme, where the LAA carrier is aggregated with another carrier(s) on a licensed spectrum as illustrated in FIG. 7. In a conventional scheme, carrier(s) on the licensed spectrum 710 is assigned as a PCell and carrier(s) on the unlicensed spectrum 720 is assigned as a SCell for a UE 730. FIG. 7 shows an example where the LAA cell comprises of a downlink carrier with an uplink carrier. Since there may be other RATs operating on the same unlicensed frequency spectrum as the LAA carrier, there is a need to enable co-existence of other RAT with the LAA on an unlicensed frequency spectrum. A carrier sense multiple access (CSMA) may be applied, for example before a UE or an eNB transmits. In the CSMA operation, the UE or the eNB monitors a channel for a predetermined time period to determine whether there is an ongoing transmission in a channel. If no other transmission is sensed in the channel, the UE or the eNB may transmit data. If there is other transmission in the channel, the LE or the eNB postpones a transmission. Hereafter, the term LAA device may refer to an eNB or a UE operating on an LAA carrier.

Figure 8:
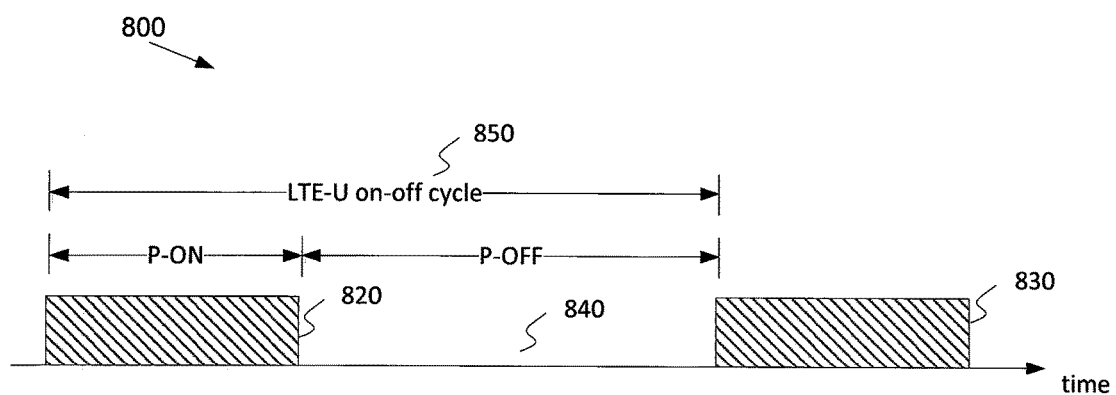
FIG. 8 illustrates an example time division multiplexing (TDM) transmission pattern of a long term evolution-unlicensed (LTE-U) downlink carrier according to embodiments of the present disclosure.

FIG. 8 illustrates an example TDM transmission pattern of an LTE-U downlink carrier 800 according to embodiments of the present disclosure. An embodiment of the TDM transmission pattern of an LTE-U downlink carrier 800 shown in FIG. 8 is for illustration only. Other embodiments may be used without departing from the scope of the present disclosure.

As illustrated in FIG. 8, an LAA carrier is ON (such as 820, 830) for a period P-ON and is OFF 840 for a period P-OFF. When the LAA carrier is ON, LTE signals are transmitted including at least one of a primary synchronization signal (PSS), a secondary synchronization signal (SSS), a common reference signal (CRS), a demodulation reference signal (DMRS), a physical downlink shared channel (PDSCH), a physical downlink control channel (PDCCH), an enhanced physical downlink common channel (EPDCCH), a channel status indication-reference signal (CSI-RS), or combinations thereof. However, when the LAA carrier is OFF, LTE signals are not transmitted.

The ON periods 820, 830 (or maximum channel occupancy time) have a maximum duration as defined by regulation (such as 10 ms). The length for P-ON periods 820, 830 are adjusted or adapted by the scheduler of the LAA according to a buffer status or a traffic pattern at the LAA carrier and a co-existence metric requirement or target. WiFi APs or other RAT transmitters utilizes the P-OFF period 840 for transmissions since the period 840 is free from LAA interference.

If a listen-before-talk (LBT) protocol is applied, there is an idle period after the end of channel occupancy (such as a frame-based equipment). For example, a minimum idle period (such as 5%) of the channel occupancy is specified. The idle period includes a clear channel assessment (CCA) period towards the end of the idle period where carrier sensing is performed by a UE. The LBT protocol is defined for a load-based equipment.

Discovery reference signals (DRS) or discovery Signals (DS) is transmitted by an LTE cell on an unlicensed spectrum. The DRS comprises physical signals such as PSS, SSS, CRS and CSI-RS, if configured. The purposes or functions of the DRS for the LTE cell on an unlicensed spectrum include, but are not limited to, discovery of the LTE cell, synchronization to the LTE cell, and RRM and CSI measurements of the LTE cell. Hereafter, the term LAA device refers to an eNB or a UE operating on a LAA carrier.

A UE is configured with one or more CSI processes per serving cell by higher layers. Each CSI process is associated with a CSI-RS resource and the CSI-interference measurement (CSI-IM) resource. A CSI reported by the UE corresponds to a CSI process configured by the higher layers. Each CSI process is configured with or without PMI/RI reporting by higher layer signaling. A UE is configured with resource-restricted CSI measurements if subframe sets are configured by higher layers. CSI reporting is periodic or aperiodic. If the UE is configured with more than one serving cell, the UE transmits the CSI reporting for activated serving cell(s) only. As a result there is a need for CSI measurements and configuration on an unlicensed spectrum as well as a licensed spectrum. Note that the embodiments according to the present disclosures are not limited to operation on unlicensed spectrum, but also on a lightly licensed spectrum, a licensed shared spectrum and the like.

Figure 9:
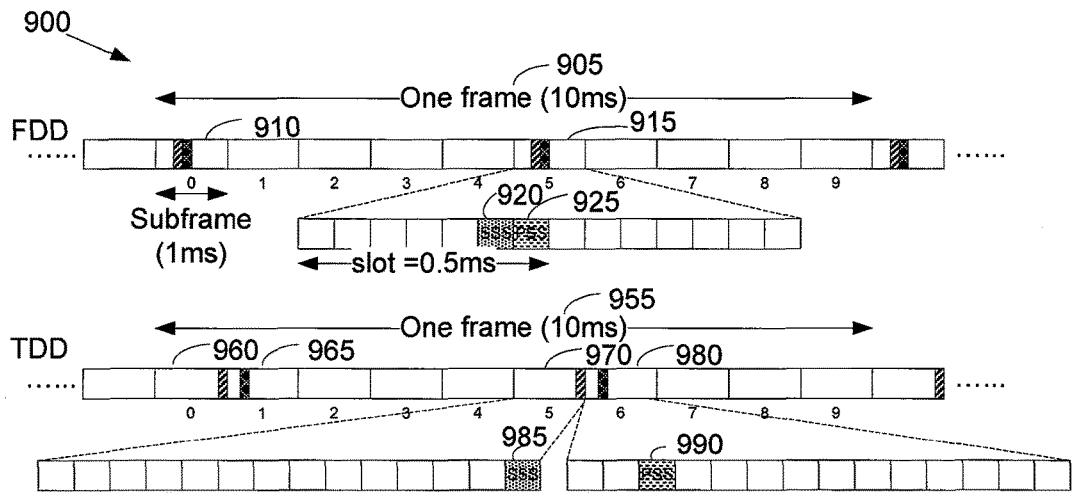
FIG. 9 illustrates an example configuration of time domain position for primary synchronization signal/secondary synchronization signal (PSS/SSS) according to embodiments of the present disclosure.

FIG. 9 illustrates an example configuration of time domain positions for PSS/SSS 900 according to embodiments of the present disclosure. An embodiment of the configuration of time domain positions for PSS/SSS 900 shown in FIG. 9 is for illustration only. Other embodiments can be used without departing from the scope of the present disclosure.

As illustrated in FIG. 9, in case of FDD, in every frame 905, a PSS 925 is transmitted within a last symbol of the first slot of subframes 0 and 5 (910 and 915), wherein a subframe includes two slots. A SSS 920 is transmitted within the second last symbol of the same slot. In case of TDD, in every frame 955, a PSS 990 is transmitted within the third symbol of subframes 1 and 6 (965 and 980), while a SSS 985 is transmitted in a last symbol of subframes 0 and 5 (960 and 970). The difference allows for the detection of the duplex scheme on a cell. The resource elements for the PSS and SSS are not available for transmissions of any other type of DL signals.

The Federal Communications Commission (FCC) defined unlicensed carriers to provide a cost-free public access spectrum. Use of unlicensed carriers by a UE is allowed only under the provisions that the UE does not generate noticeable interference to communications in licensed carriers and that communications in unlicensed carriers are not protected from interference. For example, unlicensed carriers include the industrial, scientific and medical (ISM) carriers and the unlicensed national information infrastructure (UNIT) carriers that may be used by IEEE 802.11 devices. It may be possible to deploy LTE radio access technology (RAT) on an unlicensed frequency spectrum that is known as LTE-Unlicensed (such as LTE-U) or License Assisted Access (LAA). A possible deployment scenario for the LAA is to deploy an LAA carrier as a part of carrier aggregation, where the LAA carrier is aggregated with another carrier(s) on a licensed spectrum.

In some embodiments, an LAA cell transmitting on unlicensed spectrum may support one or more transmission modes (TMs). In one example, if the LAA cell transmits CRS as on a legacy carrier, it is possible that CRS based TMs (e.g. TMs 1-8) could be supported and CRS-based CSI measurements are needed. In another example, DMRS based TMs such as TM 9 or TM 10 could be configured and CSI measurement based on CSI-RS and CSI-IM configurations would be required. In such examples, given the potentially dynamic nature of the interference experienced on an unlicensed carrier as well as the potential need for interference measurements during ON or OFF transmission states of a LAA cell, additional enhancements for CSI measurement when CRS-based TMs are configured may be considered.

In one embodiment, a UE performing interference measurements in a given subframe where a serving cell is also transmitting CRS, may receive both the serving cell and interfering cells. An interference measurement provided on CRS REs would be inaccurate due to a strong signal strength measured on the CRS REs. As a result, a UE configured with CRS-based interference measurement (CRS-IM) on a given carrier may cancel the CRS of the serving cell to estimate the interference. However when the UE is making a CSI measurement for determining the desired signal quality (e.g. channel matrix (H) measurement), the UE does not cancel the CRS transmission of the desired serving cell. If the CRS is only transmitted when the LAA cell has data to transmit and has gained access to the channel, the interference estimated after cancellation of the serving cell's CRS does not suffer from the persistent inter-cell CRS interference that results in pessimistic CQI reporting by the UE in a light traffic scenario when the CRS frequency shift of one or more neighboring cells is the same. In other words, interference estimation from the serving cell's CRS REs after CRS cancellation can more accurately reflect the average interference on the LAA PDSCH.

In such embodiment, if the CRS resource elements of one more other neighboring cells overlap with the serving cell's CRS, the UE may additionally be configured to cancel the CRS of one or more other neighboring cells of the same operator. There can be two purposes of cancelling the CRS of neighboring cells of the same operator. The first purpose is to obtain interference measurement without the contribution from one or more neighboring cells in order to estimate the CSI if one or more neighboring cells do not transmit. The second purpose is to obtain a cleaner channel estimate of the serving cell by cancelling the interference from all other neighboring cells. For the first purpose, the UE may perform multiple interference measurements, where each measurement corresponds to cancellation of a different set of neighboring cell(s). An example is given in Table 1.

TABLE 1

| Interference measurement | Purpose | Neighboring cells | |
| --- | --- | --- | --- |
| | | Cell 1 | Cell 2 |
| Measurement 1 | Estimate interference assuming cell 1 and cell 2 do not transmit simultaneously | Canceled | Canceled |

TABLE 1-continued

| Interference measurement | Purpose | Neighboring cells | |
| --- | --- | --- | --- |
| | | Cell 1 | Cell 2 |
| Measurement 2 | Estimate interference assuming cell 1 transmits and cell 2 does not transmit | Not canceled | Canceled |
| Measurement 3 | Estimate interference assuming cell 1 does not transmit and cell 2 transmits | Canceled | Not canceled |
| Measurement 4 | Estimate interference assuming cell 1 and cell 2 transmit simultaneously | Not canceled | Not canceled |

In such embodiment, if the CRS resource elements of one more other neighboring cells do not overlap with each other or the serving cell, then an interference measurement for different transmission assumptions of the neighboring cells can be obtained directly from measuring the corresponding CRS Res (e.g. when the serving cell is not transmitting). Alternatively, if the CRS resource elements of one more neighboring cells overlap but do not overlap with the serving cell's CRS, then CRS cancellation can be utilized to obtain an interference measurement for different transmission assumptions of the neighboring cells, similar to that shown in Table 1.

In another embodiment, during the CSI/IMR measurement, a UE may be configured to restrict averaging of a CSI measurement according to a signaled or configured subframe pattern. Alternatively the subframe pattern used for the measurement averaging at a UE may be reported by the UE, as well as indication of CRS-cancellation parameters used in obtaining one or more measurement quantities.

In such embodiment, a UE may be configured for this CRS cancellation for CRS-IM measurement by a higher layer configuration (e.g. CSIConfigLAA) including one or more of parameters such as a CRS-cancellation flag, a carrier indication (e.g. SCell Index), a cell ID (physical cell id), a subframe pattern (e.g. subframe index, offset), a cell-specific frequency shift (may be implicitly determined by Cell ID), a CRS transmit power level, a CSI Report time/frequency resource configuration, an MBSFN subframe configuration or reduced CRS subframe configuration. These configurations can include a list where each in the list, corresponding to a cell to be canceled, can comprise one or more of the aforementioned parameters.

Since an LAA cell may be operating according to an LBT or a discontinuous transmission (DTX) protocol, a UE may first need to detect presence of CRS in a given subframe(s). Once the UE determines that a cell is operating in an ON-state (e.g. physical layer signaling, detection of reservation signal, DRS, CRS, etc.) the UE may apply a given CRS-cancellation configuration relative to the start of the detected ON duration or detected signal type.

When a UE has performed CSI measurement or IM measurement, the UE transmits a report at a fixed or relative subframe offset from the measurement instance(s) or a CSI measurement window. An eNB may need to differentiate the contents of the report between CSI/IMR measurements or measurements based on CRS-cancellation or not. In one example, the differentiation of measurement quantities may be performed based on explicit signaling within a CSI feedback message or based on a timing or format size of a report.

In another embodiment, for a serving cell and UE configured in transmission mode 10 (e.g., TM10 as defined in LTE specification), the UE can be configured with one or more CSI-IM resource configuration(s). For example, zero-power CSI RS configuration and/or zero-power CSI RS subframe configuration may be configured via higher layer signaling for each CSI-IM resource configuration. However, as aforementioned, a network may wish for a UE configured with a CRS-based TM on an unlicensed carrier to additionally perform interference measurements during an ON or OFF duration in order to assist the efficient operation of an LAA cell. As a result, an application of an LAA CSI-IM configuration may be independent of configured TM.

In one example, a UE may be configured with one or more LAA CSI-IM resource configuration(s) via higher layer signaling. In such example, each LAA CSI-IM resource configuration may correspond to one ZP CSI-RS configuration and ZP CSI-RS subframe configuration. These configurations may also indicate one or more TMs that operate in conjunction with the LAA CSI-IM for triggering of reporting IMR measurements.

In another example, one or more CSI processes can be configured for a UE configured with a CRS-based TM on an unlicensed carrier, where each CSI process corresponds to a CSI measurement using a serving cell's CRS for the desired signal measurement and a CSI-IM resource for the interference measurement.

In yet another example, certain UEs may be capable of both CRS and CSI-RS TMs and indicate this functionality in a UE capability message to a network upon connection. If the UE additionally supports LTE operation on one or more unlicensed carriers, the UE may also indicate capability to support CSI-IM configuration and measurement in conjunction with CRS-based TMs (e.g. TMs 1-8) on an unlicensed carrier. In such example, a new PDCCH control signaling format may be defined to dynamically trigger the CSI-IM measurement on an aperiodic basis.

In yet another example a network may configure periodic IMR measurements with a predefined duration and periodicity.

In yet another example, an LAA CSI-IM configuration may indicate a restriction of IMR measurement based on one or more ZP CSI-RS configurations to certain subframes to capture different network states (e.g. ON, OFF, LBT). This restriction may be configured using higher-layer signaling as a subset of an existing ZP-CSI-RS subframe configuration or additionally as a bitmap or pattern index dynamically indicated using physical layer signaling as part of a CSI/IMR measurement trigger.

In yet another embodiment, in order for a UE to measure interference on a given carrier (e.g. for an LAA cell operating on unlicensed spectrum), a carrier or cell-specific IMR time/frequency domain pattern may be specified for a UE. The pattern may be configured such that the pattern contains one or more existing RS locations (e.g. CRS, CSI-RS, or DMRS) or may be orthogonal of existing RS locations in an RE grid as defined in LTE specifications. In such embodiment, the pattern may additionally comprise a frequency (e.g. RE) and time (e.g. subframe) domain offset that allows multiple patterns to be configured for a same UE corresponding to measurement of different cells or different transmission states (e.g. ON, OFF, or LBT). In such embodiment, the pattern (e.g., IMR pattern) may be fixed or pseudo-randomly shifted or hoped between measurement instances. The random hop or shift may be performed based upon a time-domain index (e.g. subframe number (SFN) or subframe index) or a cell-specific index (e.g. primary cell ID (PCID)). A physical layer CSI-IM trigger message may include a pattern index or hopping index for the UE to apply in a given instant. Additionally the report may indicate a corresponding IMR pattern index used as part of the measurement.

In yet another embodiment, a UE configured to measure CSI during an ON duration may utilize a CRS, a CSI-RS, or a CSI-IM configuration, however such a pattern may not be applied during an OFF duration since no transmissions are expected from an LAA cell due to LBT or DTX operation. Instead a UE may be configured to make an IMR measurement utilizing a second IMR pattern if an OFF period is detected or signaled. In one example, the second IMR pattern can utilize the full bandwidth. In another example, the second pattern can be based on CRS, CSI-RS, or CSI-IM but with higher density to improve measurement accuracy (e.g. the IMR measurement can be based on CRS port 0 when the cell is ON but can be based on RE locations of CRS port 0 and 1 when the cell is OFF). In yet another example, the second pattern can be up to UE implementation within the system bandwidth.

Figure 10:
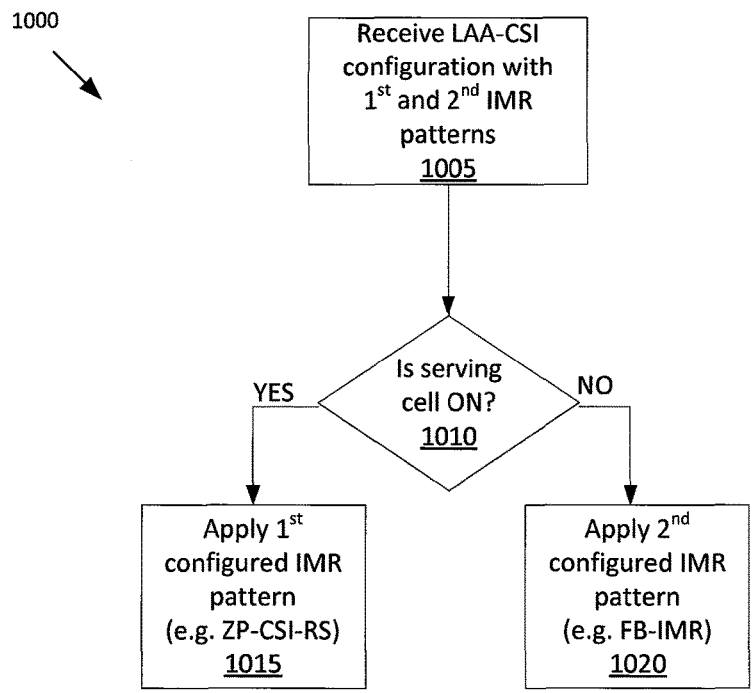
FIG. 10 illustrates an example of a method for an interference measurement resource (IMR) pattern selection based on cell state according to embodiments of the present disclosure.

FIG. 10 illustrates an example of a method for an interference measurement resource (IMR) pattern selection 1000 based on cell state according to embodiments of the present disclosure, as may be performed at a UE. An embodiment of the method for an interference measurement resource (IMR) pattern selection 1000 shown in FIG. 10 is for illustration only. Other embodiments can be used without departing from the scope of the present disclosure.

As illustrated in FIG. 10, the method 1000 for the IMR pattern selection based on cell state begins at block 1005, where the UE receives an LAA-CSI configuration with the first and the second IMR patterns. At block 1010, if a serving cell is ON state, the UE applies the first configured IMR pattern (e.g., ZP-CSI-RS) to select the IMR pattern at block 1015. If not, the UE applies the second configured IMR patterns (e.g., full-bandwidth (FB)-IMR) to select the IMR pattern at block 1020. In one embodiment, the second IMR pattern may be configured by higher layer signaling as part of the previously described LAA CSI configuration. In such embodiment, an additional subframe restriction pattern may be applied to the second IMR pattern, which is the same as a CSI-RS subframe restriction pattern or one or more new and independent subframe restriction pattern(s) may be configured by higher layer signaling and applied by the UE upon the second IMR pattern measurement or a pattern is triggered by an index in a physical layer message. In another embodiment, a UE may be configured to indicate in a measurement report a bandwidth of the measurement utilized by the UE (e.g. FB or fraction of system bandwidth).

Figure 11:
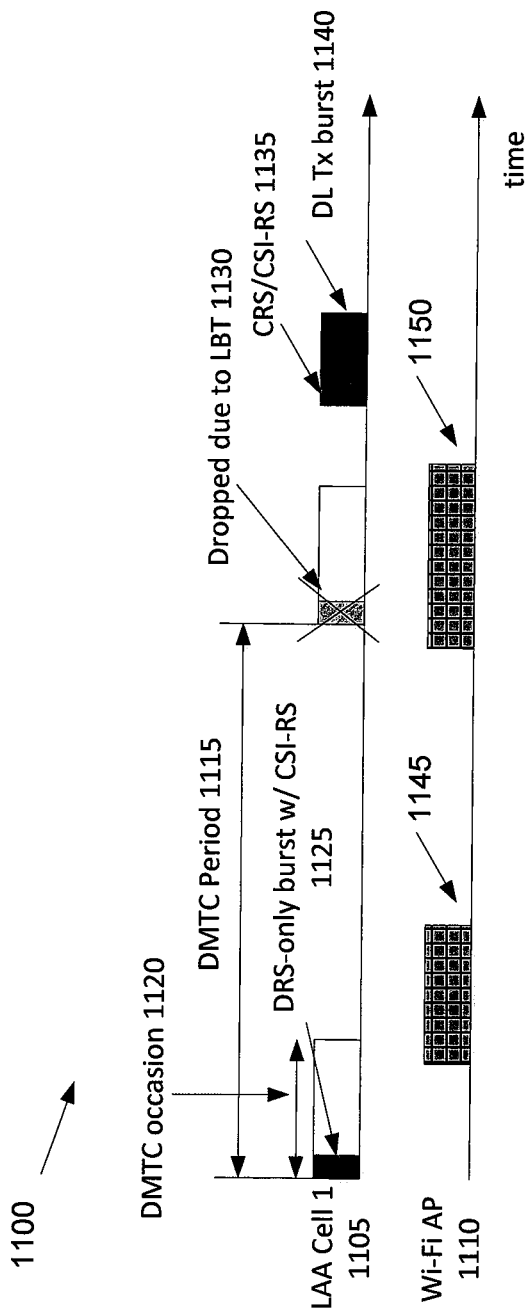
FIG. 11 illustrates an example CSI measurement in a discovery reference signal (DRS) occasion according to embodiments of the present disclosure.

FIG. 11 illustrates an example CSI measurement 1100 in a discovery reference signal (DRS) occasion according to embodiments of the present disclosure. An embodiment of the CSI measurement 1100 in a discovery reference signal (DRS) occasion shown in FIG. 11 is for illustration only. Other embodiments can be used without departing from the scope of the present disclosure.

As illustrated in FIG. 11, a DMTC period 1115 may be set on an LAA cell 1105. During the DMTC period 1115, a DMTC 1120 may be occurred. More specifically, a UE may receive the DMTC 1120 including DRS-only burst with CSI-RS 1125 in the LAA cell 1105 if a data transmission 1145 from an WiFi AP 1110 is not overlapped with the DMTC occasion 1120. In contrast, the UE may not receive the DMTC occasion 1130 due to an LBT protocol. For example, if a data transmission 1150 from the WiFi AP 1110 is overlapped with the DMTC occasion 1130, the UE may not receive the DMTC occasion 1130. After receiving the DMTC occasion 1120, the UE may receive CRS/CSI-RS 1135 with the DL Tx data burst 1140.

As illustrated in FIG. 11, a UE may be configured to measure CSI during one or more DRS occasions 1120, 1130 opportunistically based on detection of CRS and/or CSI-RS present 1135 in a DRS occasion 1120. While on a licensed carrier, DRS occasions are periodically occurring and a UE expects the presence of at least the PSS/SSS and CRS and any configured CSI-RS within a DRS occasion. However, due to a need for LBT or DTX of an LAA cell 1105 on an unlicensed carrier, a UE may not be able to measure CSI every potential DRS occasion 1130.

In one embodiment, a UE may be configured with a DRS configuration and attempts to measure CSI based on either the CRS or CSI-RS depending on the TM configuration or other higher layer LAA CSI configuration as aforementioned. Upon successfully detecting the CRS and/or CSI-RS of the DRS occasion within a DMTC the UE may autonomously report a CSI measurement (including either or both H and interference measurement components) at the next configured CSI reporting instance. In another embodiment, a CSI measurement report includes bitmap information indicating whether a CSI measurement based on a received reference signal is included in the CSI measurement report. In yet another embodiment, the CSI measurement report is not transmitted to the eNB at a next configured CSI reporting instance if the CSI measurement has not been performed.

The CSI reporting instance may be configured independently of the DRS occasion timing or may be configured relative to the timing of the DMTC (e.g. n−4 subframes after the last subframe of the DMTC).

In another embodiment, a UE may be configured with an LAA CSI configuration that includes one or more DRS occasions/configurations. Using physical layer signaling an LAA cell may trigger the UE to measure CSI/IMR upon the next one or multiple configured or detected DRS transmission that may additionally correspond to one or more CRS, ZP or non-ZP CSI-RS configurations. The UE may additionally be configured to report a CSI/IMR measurement based on an opportunistic DRS transmission using physical layer signaling. A timing of the report transmission may be relative to a subframe where a trigger was received, or relative to a timing of a configured DMTC or detected DRS occasion. Although triggered, a UE may not transmit a CSI report if no signals used for CSI measurement are detected by the UE during a reporting interval.

In yet another embodiment, a CSI-RS transmitted with DRS can share the same configuration as the CSI-RS configured for RRM measurement. In one example a UE may be configured to measure a channel or CSI in addition to performing RRM measurement implicitly when the CSI-RS is configured with the DRS (e.g. by measDS-config) or may be explicitly configured to measure the channel in addition to (or instead of) RRM measurements by RRC or physical layer signaling (e.g. aperiodic CSI trigger). In order to support CSI measurement, the CSI-RS configuration for the DRS can be extended to include one or more of a number of NZP-CSI-RS antenna ports, CSI-IM resource(s), scrambling identity and PC (e.g., ratio of PDSCH EPRE to CSI-RS EPRE assumed by a UE when deriving CSI feedback). The configurations can be the same or different than the configurations for the other CSI-RS configuration such as the (conventional) periodic CSI-RS configuration. It can be beneficial to configure different PC than that configured for a periodic CSI-RS configuration since the EPRE of CSI-RS of DRS can be different than that configured for the periodic CSI-RS configuration. The UE can assume the additional/new PC when measuring CSI based on CSI-RS of DRS and assume the conventional PC value when measuring CSI based on CSI-RS transmitted outside of DRS, during control/data transmission burst.

In yet another embodiment, when a CSI-RS transmitted with DRS can support channel /CSI measurement, it is beneficial to introduce an additional CSI-RS configuration for the DRS with additional or separate number of ports than that configured by the CSI-RS configuration for RRM. The resources for the CSI-RS configuration for RRM measurement could be configured as a subset of the CSI-RS configuration for channel/CSI measurement, or the CSI-RS configuration for RRM measurement could be configured independently of the CSI-RS configuration for channel/CSI measurement. The CSI-RS of DRS configuration for CSI measurement can also include one or more CSI-IM resources, scrambling identity and PC (ratio of PDSCH EPRE to CSI-RS EPRE assumed by a UE when deriving CSI feedback). The configurations can be the same or different than the configurations for the other CSI-RS configuration such as the (conventional) periodic CSI-RS configuration.

In yet another embodiment, a CSI-RS transmitted with DRS occasions for a channel measurement could be configured by linking a periodic CSI-RS configuration and the CSI-RS transmitted with DRS occasions for channel measurement. In one example of this link, a resource configuration (e.g. one or more of antennaPortsCount, resource-Config, scramblingIdentity as determined in LTE specification) of the CSI-RS with DRS is the same as the periodic CSI-RS, except that a subframe offset and periodicity (e.g. subframeConfig as determined in LTE specification) is not applied, but instead the timing is based on the subframe in the DMTC where the DRS occasion is transmitted. This allows greater opportunity for CSI-RS transmission than just a periodic configuration that may occasionally overlap with a DRS occasion that is moving within the DMTC, and avoids additional impact on the signaling for the DRS configuration of CSI-RS for RRM. The presence of this CSI-RS in the same subframe as the DRS occasion can be configurable by higher layers (e.g. using one bit RRC signaling). In one example, it can be beneficial to configure different PC than that configured for a periodic CSI-RS configuration since the EPRE of CSI-RS of DRS can be different than that configured for the periodic CSI-RS configuration. The UE can assume additional/new PC when measuring CSI based on CSI-RS of DRS and assume the conventional PC value when measuring CSI based on CSI-RS transmitted outside of DRS, during control/data transmission burst.

In another example, the CSI-RS transmitted with DRS occasions for channel measurement could also be applied to aperiodic CSI-RS/CSI-IM transmissions occurring during downlink data transmission bursts. Resources of the aperiodic CSI-RS/CSI-IM could be configured by higher-layer signaling. Aforementioned examples could be similarly applied to link aperiodic CSI-RS/CSI-IM to the periodic CSI-RS/CSI-IM configuration. A resource configuration is the same except that a subframe offset/periodicity is not applied.

In such example, an explicit indication of the presence of aperiodic CSI-RS/CSI-IM is beneficial in order to reduce an ambiguity between an eNB and UE regarding the availability of valid CSI measurement opportunities. In such example, L1 signaling is used to indicate the presence of the aperiodic CSI-RS/CSI-IM in the current subframe. The L1 signaling may be a common signaling for all UEs in the same cell (e.g. one or two bits could be added in the DCI that includes necessary information of DL transmission burst).

In addition to the CSI-RS configured to be transmitted with DRS within the DMTC, a periodic or aperiodic CSI-RS may also be transmitted in data bursts at least partially contained within the DMTC. As a result, the configured periodic/aperiodic CSI-RS transmission instances may collide with the CSI-RS configured to be transmitted with the DRS. If the resources used by the periodic/aperiodic CSI-RS overlap with one or more signals of the DRS/CSI-RS configured to be transmitted with DRS within the DMTC, a dropping rule may be defined. In one example, the periodic/aperiodic CSI-RS transmission is dropped by an eNB when the collision occurs and a UE assumes the presence of the CSI-RS configured to be transmitted with the DRS and then performs measurement accordingly. In another example, the periodic/aperiodic CSI-RS is not dropped, but the periodic/aperiodic CSI-RS is applied instead of the CSI-RS configuration of the CSI-RS configured to be transmitted with the DRS, and the UE assumes the presence of the periodic/aperiodic CSI-RS and perform measurement accordingly.

If multiple PSS/SSS/CRS transmissions occur within the DMTC that have the same resources as the configured DRS, there may be ambiguity about whether a collision is occurring between a DRS occasion and a normal subframe 0/5 that is part of a DL data burst transmitted within the DMTC. In one example, a UE detecting a DRS may consider the first detected occasion within the DMTC to be the only DRS occasion utilized for RRM measurement (and/or CSI measurement configured for DRS). When CSI-IM is configured for control/data transmission burst and is not configured for DRS-only transmission (DRS is not multiplexed with control/data), the UE can identify the presence of CSI-IM via explicit control signaling, for example, via the presence of a UE common signaling (e.g. common DCI) that is transmitted during control/data transmission burst. In another example, if more than one DRS occasion is detected within the DMTC, the UE may select one occasion or multiple occasions to measure for the purpose of RRM measurement. For the purpose of channel/CSI measurement, the UE may detect the presence of L1 signaling (e.g. a common DCI) to determine whether to apply a periodic/aperiodic CSI-RS configuration or the configuration of the CSI-RS transmitted with DRS.

When CRS based CSI measurement is supported for CRS of DRS, an additional or separate PA that indicates the ratio of PDSCH EPRE to cell-specific RS EPRE among PDSCH REs for the purpose of CSI derivation can be signaled to the UE (e.g. via RRC signaling). The UE can assume the additional/new PA when measuring CSI based on CRS of DRS and assume the conventional PA value when measuring CSI based on CRS transmitted during control/data transmission burst. In one example, an additional or separate PB can for CSI measurement based on CRS of DRS can also be signaled (e.g. by RRC signaling). A number of CRS ports can also be configured for CRS of DRS.

In some embodiments, a UE may be configured with a mix of cells operating on licensed or unlicensed cells. Due to the nature of opportunistic transmissions on the unlicensed cells a timing and content of CSI/IMR measurement reports may differ from the CSI/IMR measurement reports on licensed cells. In one embodiment, a measurement reports may be sent independently for licensed and unlicensed carriers. However there is a need to consider multiplexing of licensed and unlicensed UEs feedback to improve an efficiency of UL transmissions and reduce overall control message overhead.

Figure 12:
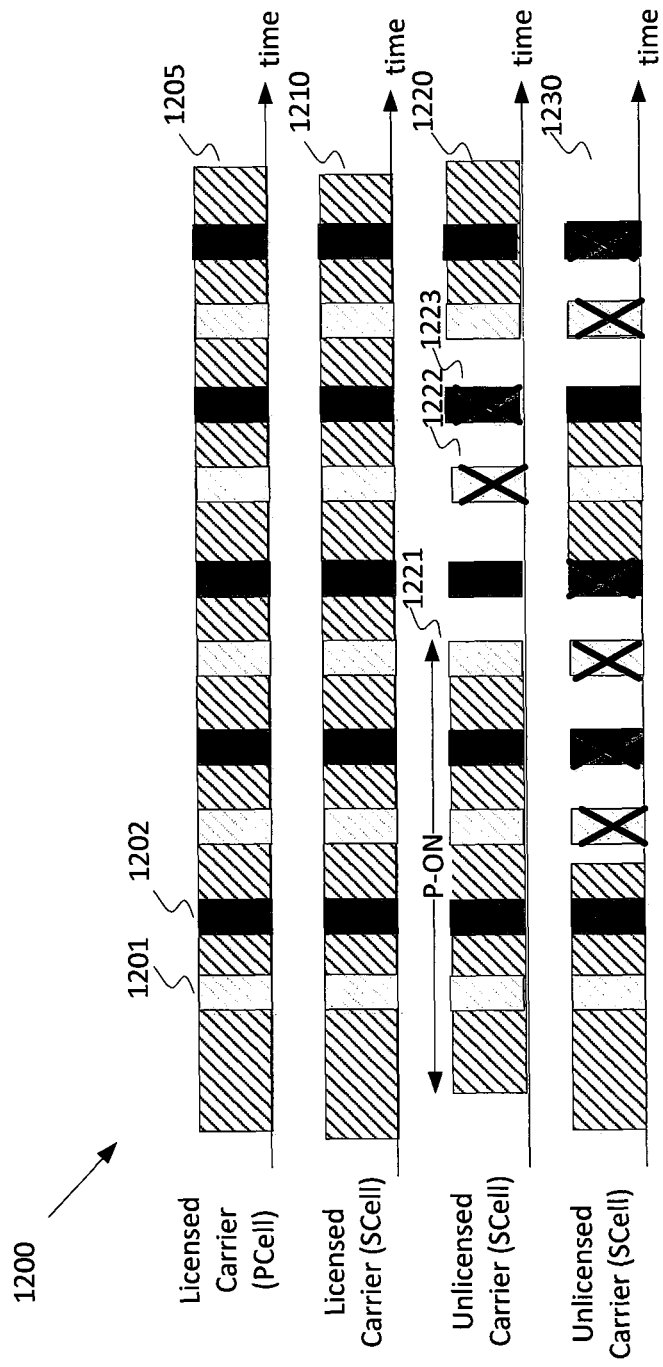
FIG. 12 illustrates an example CSI measurement and feedback across licensed and unlicensed carriers according to embodiments of the present disclosure.

FIG. 12 illustrates an example CSI measurement and feedback 1200 across licensed and unlicensed carriers according to embodiments of the present disclosure. An embodiment of the CSI measurement and feedback 1200 across licensed and unlicensed carriers shown in FIG. 12 is for illustration only. Other embodiments can be used without departing from the scope of the present disclosure.

As illustrated in FIG. 12, the CSI measurement and feedback 1200 comprises a licensed carrier PCell 1205, a licensed carrier SCell 110, an unlicensed carrier SCell 1220, 1230. Each of carries includes subframes for CSI measurement opportunities 1201 and CSI feedback report 1202. For example, a UE performs the CSI measurement on the subframe 1201 and performs CSI feedback reporting on the subframe 1202. As illustrated in FIG. 12, the UE is configured with multiple carriers (e.g., licensed and unlicensed spectrum) for a CSI/IM reporting. However, unlike the licensed carriers 1205 and 1210, the unlicensed carrier 1220 and 1230 transmissions are subject to a constrained P-ON durations (e.g. due to LBT). In this case valid CSI measurement opportunities 1201 may not be present on all (or any) unlicensed carriers 1222. As a result, a number of carriers included in the CSI feedback report 1202 may vary depending on the availability of the CSI measurement resource on the unlicensed carrier(s) 1223.

In some embodiment, a format utilized by a UE as part of a CSI/IMR report may depend on whether the measurements were made on only licensed carrier, unlicensed carrier, or both types of carriers. In one example, depending on which measurement types are included in a report, the format of the report may need to switch. The formats utilized for the unlicensed carrier and a combination of licensed and unlicensed carrier measurement reports may be from a set of existing formats defined for the licensed carriers (e.g. PUCCH format 2A/3 or PUSCH format if simultaneous PUCCH and PUSCH is not configured for the UE), or may be based on new formats designed specifically for the aforementioned measurement type report combinations. A differentiation of the report formats may additionally be used to distinguish CSI or IMR measurements on an unlicensed carrier.

In another example, the reporting mode utilized by a UE as part of a CSI/IMR report may depend on whether the measurements were made on only licensed carrier, unlicensed carrier or both types of carriers. The reporting mode utilized for the unlicensed carrier and a combination of licensed and unlicensed carrier measurement reports may be from the set of existing formats defined for licensed carriers, or may be based on new formats designed specifically for the aforementioned measurement type report combinations. The aforementioned reporting mode can also correspond to PUSCH reporting modes (e.g. for TM 10: Modes 1-2, 2-2, 3-1, 3-2 if the UE is configured with PMI/RI reporting and number of CSI-RS ports >1; modes 2-0, 3-0 if the UE is configured without PMI/RI reporting or number of CSI-RS ports=1) or PUCCH reporting modes (e.g. for TM 10: Modes 1-1, 2-1 if the UE is configured with PMI/RI reporting and number of CSI-RS ports>1; modes 1-0, 2-0 if the UE is configured without PMI/RI reporting or number of CSI-RS ports=1). A differentiation of report formats may additionally be used to distinguish CSI or IMR measurements on an unlicensed carrier.

A message from an eNB configuring or triggering a report may indicate a format type, which provides an indication to a UE of which type(s) of measurement the UE multiplexes in the report. Additionally, the eNB may determine the measurement and or carrier types included in a received measurement report from the UE based on the detected report format.

In yet another example, a payload size for a CSI/IMR reporting may be differentiated depending on a measurement state (e.g. CSI/IMR, or ON/OFF state) or a carrier state (e.g. licensed or unlicensed carrier state), depending on if the licensed only or both licensed and unlicensed CQI are reported. For example, a UE may only report for an unlicensed carrier if a valid measurement report is obtained and a size of the measurement report implicitly indicates a number of carriers measured and whether the measurement corresponds to one or more unlicensed carriers. In such example, an X-bit bitmap (e.g. X=5 bits for up to 32 CCs) may be included at the beginning of CSI feedback message to indicate whether CSI was measured on a given LAA carrier. Therefore, an eNB and UE are allowed to avoid ambiguity about whether CSI was successfully measured at the UE by setting the bitmap value to '1' for a successfully decoded CSI, otherwise '0' if not detected. In addition, a PUSCH message may start with the fixed bitmap, followed by A-CSI or P-CSI payloads only for the carriers indicated in the bitmap (value of '1'). In addition, an out-of-range may be indicated for the carriers with a bitmap value of '0.' In such example, a CSI indication bitmap may be jointly coded with the CSI payload. Therefore, an overhead may be reduced, but a blind detection at the eNB to know a full size of the message is required. In such example, a CSI indication bitmap may be separately coded with the CSI payload. Therefore, a blind decoding at the eNB may not be needed since the bitmap size and location within the message is fixed (e.g. the first X bits+CRC of the message). In addition, a tail-biting convolutional coding (TBCC) can be applied for coding for the bitmap and CRC. Furthermore, if at the eNB the CRC check fails for the CSI indication bitmap, the eNB may discard the remainder of the message and use latest available CSI for scheduling.

In yet another example, a content of a CSI/IMR measurement report may differentiate a measurement or carrier type depending on the content of the report. For example a UE measuring on a licensed carrier and unlicensed carrier may be configured to report multiplexed measurements for both carriers in a single report, but the availability of a valid CSI measurement on the unlicensed carrier may not be guaranteed at the time of the report triggering or configuration due to the opportunistic nature of transmission on an unlicensed cell. In this example the UE may still include a value for a measurement on an unlicensed carrier but the value is reserved or indicated to be out-of-range if a valid measurement is not available.

In some embodiments, a UE may be configured with one or more set of preconfigured PUSCH resources for reporting CSI/IMR measurements by higher layer signaling (e.g. RRC). The UE receiving a configured trigger, (e.g. DCI, LAA Preamble, or DRS), triggers an aperiodic grant for a CSI/IMR report on those preconfigured resources. This trigger may correspond to single or multi-shot PUSCH feedback, where a number of feedback reports is configured by higher layers or corresponds to periodic, fixed intervals during the detected ON duration. In one example, the detection of an ON duration may be used to trigger the one-shot or multi-shot grant for the measurement reports.

In some embodiments, multiple CSI/IMR measurement instances may be configured for a UE and the UE may average over these multiple instances before reporting a CSI or IMR value. As part of the measurement report the UE may track the average and/or variance of measurements and provide an absolute or relative delta of the values compared to a previous measurement in the report. This measurement variance or delta may be utilized to determine whether or not the UE triggers a new report if the value is outside or within a configured range. The UE may also be configured to only report the delta of the CSI or IMR report unless otherwise indicated by an eNB that the absolute measurement value is reported. In one example, a single subframe averaging may be applied for CRS-based and CSI-RS-based CSI measurement. The most recent valid CSI reference is utilized when a measurement report is periodically/aperiodically triggered.

In some embodiments, for an unlicensed carrier that supports an UL operation, a UE may periodically report a CCA measurement as part of an LBT procedure. In such embodiments, a report may additionally be used by a network for the purpose of CSI or IMR measurement although the CCA measurement granularity may be different than a report based on CRS or CSI-RS measurement granularity. In one example the CCA measurement granularity may be on an OFDM symbol basis, while the CSI/IMR report utilizes one or more subframes for measurement. In another example, the UE may provide the CCA measurement report based on a dynamic trigger (e.g. physical layer signaling) or may aggregate one or more reports as part of a higher-layer message (e.g. RRC message). In yet another example, the CCA measurement report may be triggered by physical layer signaling as part of an existing or a new CSI request field. In yet another example, the CCA measurement report may be triggered as part of a new field in a DCI as shown in Table 2.

TABLE 2

| Value of CCA request field | Description |
|---|---|
| '00' | No aperiodic CCA report is triggered |
| '01' | Aperiodic CCA report is triggered for serving cell |

In some embodiments, a scheduler for an LAA cell may utilize a CSI feedback in determining which UEs to schedule in different time/frequency resources of an ON-duration. For example, until stable CSI information is received at an eNB, a conservative scheduling approach may be taken (e.g. using a low MCS for TBs). However the eNB may configure the UE with multiple CSI processes, utilizing IMR measurements to determine interference strength of neighboring nodes from the UE's perspective. Due to an LBT applied by different nodes, the interference observed during different periods may vary greatly as the strongest sources of interference are typically not seen during the ON-duration because of the backoff procedure (except for collision or hidden-node scenarios). Since the eNB can observe the CSI reports of multiple cells from different UEs, the eNB can build a data base of active cells for a single UE or groups of UEs that are geographically correlated across time. Table 3 is an example of this type of active cell hypothesis database based on CSI/RRM measurements. Multiple active sets of cells (e.g. A, B, C) are identified as measured by different UEs at time instants T=0 and T=1. While both UE2 and UE1 observed cells A and B in both time instances, only UE1 observes cell C and only in T=1. This information can be useful in scheduling UE1 and UE2 by the likely set of interfering and contending nodes.

TABLE 3

| Active Set | T = 0 | T = 1 |
|---|---|---|
| A, B | UE1 and UE2 | UE1 and UE2 |
| C | | UE1 |

In one example, addition to measurements during the ON-duration, the eNB can utilize OFF-period IMR/RSSI reports to detect hidden nodes by comparing with ON period measurements from the same UE (since eNB cannot measure interference during ON duration). These RSSI measurements may have the granularity of the CCA slots or one or more slots/subframes.

In another example, intra/inter-operator coordination can also be used to assist in a scheduling, by sharing ON durations, time/frequency resource allocation patterns, CSI hypothesis databases, and the eNBs may coordinate OFF periods for hidden node detection on on-demand basis.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A user equipment (UE) comprising:
a transceiver configured to receive, from an eNodeB (eNB), a plurality of discovery reference signals (DRS) within a DRS measurement timing configuration (DMTC) period; and
at least one processor configured to detect the plurality of DRS that occurred within the DTMC period and to select a first detected occurrence of a DRS of the detected plurality of DRS in a first subframe within the DTMC period to be the DRS used for transmitting a channel state information (CSI) measurement report, wherein the first subframe includes a primary synchronization signal, a secondary synchronization signal, and a cell-specific reference signal,
wherein the transceiver is further configured to transmit, to the eNB, the CSI measurement report according to a configuration based on the selected DRS.

2. The UE of claim 1, wherein at least one processor is configured to identify that one or more reference signals are received aperiodically in one or more DRS occasions.

3. The UE of claim 2, wherein a presence of the one or more reference signals in the one or more DRS occasions is configured by an L1 signal received from the eNB.

4. The UE of claim 1, wherein the configuration is determined from a higher layer signal or an L1 signal received from the eNB, the configuration determined independently from a configuration for radio resource measurement (RRM) reports.

5. The UE of claim 1, wherein the CSI measurement report includes bitmap information indicating whether a CSI measurement based on one or more reference signals are included in the CSI measurement report.

6. The UE of claim 1, wherein a reference signal is received and measured in a first subframe of multiple detected subframes including one or more synchronization and common reference signals in a period of a DRS measurement timing configuration, and wherein a downlink data burst is received over a physical downlink shared channel (PDSCH), a physical downlink control channel (PDCCH), or an enhanced physical downlink control channel (EPDCCH), the downlink data burst being included in subframes 0 and 5.

7. A method for channel state information (CSI) measurement in a wireless communication system, the method comprises:
receiving, from an eNodeB (eNB), a plurality of discovery reference signal (DRS) within a DRS measurement timing configuration (DMTC) period;
detecting the plurality of DRS that occurred within the DTMC period and selecting a first detected occurrence of a DRS of the detected plurality of DRS in a first subframe within the DTMC period to be the DRS used for transmitting a CSI measurement report, wherein the first subframe includes a primary synchronization signal, a secondary synchronization signal, and a cell-specific reference signal; and
transmitting, to the eNB, the CSI measurement report according to a configuration based on the selected DRS.

8. The method of claim 7, further comprising identifying that one or more reference signals are received aperiodically in one or more DRS occasions.

9. The method of claim 8, wherein a presence of the one or more reference signals in the one or more DRS occasions is configured by an L1 signal received from the eNB.

10. The method of claim 7, wherein the configuration is determined from a higher layer signal or an L1 signal received from the eNB, the configuration determined independently from a configuration for radio resource measurement (RRM) reports.

11. The method of claim 7, wherein the CSI measurement report includes bitmap information indicating whether a CSI measurement based on a received reference signal is included in the CSI measurement report.

12. The method of claim 7, wherein a reference signal is received and measured in a first subframe of multiple detected subframes including one or more synchronization and common reference signals in a period of a DRS measurement timing configuration, and wherein a downlink data burst is received over a physical downlink shared channel (PDSCH), a physical downlink control channel (PDCCH), or an enhanced physical downlink control channel (EPDCCH), the downlink data burst being included in subframes 0 and 5.

13. An eNodeB (eNB) comprising:
a transceiver configured to:
transmit, to a user equipment (UE), a plurality of discovery reference signal (DRS) within a DRS measurement timing configuration (DMTC) period; and
receive, from the UE, a channel state information (CSI) measurement report according to a configuration based on a selected DRS of the plurality of transmitted DRS; and
at least one processor configured to detect the plurality of DRS that occurred within the DMTC period and to select a first detected occurrence of a DRS of the detected plurality of DRS in a first subframe within the DTMC period to be the DRS used for the transmitted CSI measurement report from the UE, wherein the first subframe includes a primary synchronization signal, a secondary synchronization signal, and cell-specific reference signals.

14. The eNB of claim 13, wherein the at least one processor is further configured to identify that one or more reference signals are transmitted aperiodically in one or more DRS occasions.

15. The eNB of claim 14, wherein a presence of the one or more reference signals in the one or more DRS occasions is configured by an L1 signal transmitted to the UE.

16. The eNB of claim 13, wherein the at least one processor is further configured to:
 identify whether a CSI measurement is included in the CSI measurement report based on bitmap information received from the UE, the bitmap information being included in the CSI measurement report; and
 process the CSI measurement report.

17. The eNB of claim 13, wherein the configuration is determined from a higher layer signal or an L1 signal transmitted from the eNB, the configuration determined independently from a configuration for radio resource measurement (RRM) reports.

18. The eNB of claim 13, wherein the eNB uses a latest available CSI measurement report when the eNB receives the CSI measurement report including bitmap information indicating that a CSI measurement has not been successfully achieved at the UE.

19. The eNB of claim 13, wherein the at least one processor is further configured to drop one or more reference signals when resources for the one or more reference signals are overlapped with resources for one or more signals to be transmitted in DRS occasions.

20. The eNB of claim 13, wherein the transceiver is further configured to transmit reference signals using one or more subframes including one or more synchronization and common reference signals in a period of a DRS measurement timing configuration (DMTC), and wherein a downlink data burst is transmitted over a physical downlink shared channel (PDSCH), a physical downlink control channel (PDCCH), or an enhanced physical downlink control channel (EPDCCH), the downlink data burst being included in subframes 0 and 5.

* * * * *